US012251797B2

(12) United States Patent
Koenig et al.

(10) Patent No.: US 12,251,797 B2
(45) Date of Patent: Mar. 18, 2025

(54) TOOL BIT HOLDER

(71) Applicants: Tate Koenig, Aurora, OR (US); Llewellyn Evans, South West Rocks (AU)

(72) Inventors: Tate Koenig, Aurora, OR (US); Llewellyn Evans, South West Rocks (AU)

( * ) Notice: Subject to any disclaimer, the term of this patent is extended or adjusted under 35 U.S.C. 154(b) by 400 days.

(21) Appl. No.: 17/960,786

(22) Filed: Oct. 5, 2022

(65) Prior Publication Data

US 2023/0114502 A1 Apr. 13, 2023

Related U.S. Application Data

(60) Provisional application No. 63/255,298, filed on Oct. 13, 2021.

(51) Int. Cl.
*B25B 15/00* (2006.01)

(52) U.S. Cl.
CPC .................................. *B25B 15/004* (2013.01)

(58) Field of Classification Search
CPC ..... B25B 15/004; B25B 15/008; B25G 1/005; B25G 1/105
USPC ........................................ D8/24, 80, 82, 107
See application file for complete search history.

(56) References Cited

U.S. PATENT DOCUMENTS 2,569,069 A * 9/1951 Motel .................... B25G 1/005 81/436
2,715,028 A * 8/1955 Dossie .................... B25B 13/56 81/436
3,850,056 A * 11/1974 Allen ...................... B25G 1/066 81/439
4,640,155 A * 2/1987 Condon .................. B25B 23/16 81/439
5,822,830 A * 10/1998 Lin ........................ B25G 1/005 81/177.1
6,332,381 B1 * 12/2001 Vasudeva ............. B25B 15/008 81/177.1
6,345,557 B1 * 2/2002 Kuo ........................ B25B 23/00 81/177.2
6,701,813 B2 * 3/2004 Hu ........................ B25B 23/141 81/473
6,766,717 B2 * 7/2004 Hu ...................... B25B 23/1427 81/478
7,810,413 B2 * 10/2010 Liu .......................... B25G 3/24 81/439
8,336,428 B2 * 12/2012 Johnson ................ B25B 13/461 81/438
8,499,667 B2 * 8/2013 Johnson ................. B25G 1/005 81/177.1
8,757,033 B2 * 6/2014 Johnson .................. B25B 13/46 81/177.2
9,193,058 B2 * 11/2015 Gallegos ............... B25B 15/008
9,387,579 B2 * 7/2016 Johnson ................... B25G 3/28

(Continued)

*Primary Examiner* — David B. Thomas

(57) ABSTRACT

A tool bit holder that accommodates and secures specific ranges of hexagonal wrench sizes in different physical orientations therein, for four purposes: speed rotation of the tool for fast bolt extraction, support of the hexagonal wrench's shaft for an increased torque application, mechanically strengthening of a hexagonal wrench, and for the application of torque centered about the longitudinal axis of the working arm of the hexagonal tool bit so as to prevent the stripping out of the hexagonal socket in the mechanical fastener.

8 Claims, 12 Drawing Sheets

(56) References Cited

U.S. PATENT DOCUMENTS

| | | | | |
|---|---|---|---|---|
| 9,533,404 | B2 * | 1/2017 | Hu | B25G 1/085 |
| 9,604,349 | B2 * | 3/2017 | Johnson | B25B 13/463 |
| D793,191 | S * | 8/2017 | Palsson | D8/24 |
| 10,207,400 | B2 * | 2/2019 | Gallegos | B25G 3/24 |
| 10,434,631 | B2 * | 10/2019 | Johnson | B25B 13/461 |
| 10,618,158 | B2 * | 4/2020 | Liu | B25B 23/16 |
| 11,072,056 | B2 * | 7/2021 | Tsai | B25B 15/008 |
| 11,103,985 | B2 * | 8/2021 | Tsai | B25G 1/005 |
| 11,203,108 | B2 * | 12/2021 | Tsai | B25B 15/008 |
| 2003/0110906 | A1 * | 6/2003 | Li | B25G 1/005<br>81/177.1 |
| 2019/0134804 | A1 * | 5/2019 | Gallegos | B25G 1/063 |

* cited by examiner

TOOL BIT HOLDER

CROSS-REFERENCE TO RELATED APPLICATIONS

THIS APPLICATION CLAIMS THE BENEFIT OF U.S. PROVISIONAL PATENT APPLICATION NO. 63/255,298, FILED Oct. 13, 2021, WHICH IS INCORPORATED BY REFERENCE HEREIN IN ITS ENTIRETY.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to manual hand tools, and more particularly to tool bit holders optimized for speed and torque when using hexagonal tools and bits.

BACKGROUND

Some of the most common hand tools used, especially for technicians working on computers or other smaller, delicate electronic devices, are hexagonal wrenches and hexagonal screwdriver bits. These are used to remove various types of mechanical fasteners whether they are tapered or have a socket head design.

In the way of an example, when disassembling a computer carcass or the like, there are a plethora of hexagonal head tiny machine bolts, each with a fine thread, used to hold together the shell that houses the components. Often, there is an adhesive thread locker applied to these machine bolts requiring considerable force to break loose the bolt. Keeping the working end of the hexagonal wrench in the bolt recess is difficult since the torque is applied from a position perpendicular and offset from the longitudinal axis of the engaged shaft of the hexagonal wrench. Once the bolt is broken free there are multiple rotations of the hexagonal wrench needed to dislodge the bolt from the carcass. This process of bolt removal is time consuming, and because the hexagonal head machine bolts are so small, the torque exerted through the hexagonal head wrench often twists the wrench before the bolt is loosened. If the bolt is loosened, the hexagonal head tools are very clumsy when attempting numerous revolutions to extract the bolt.

Henceforth, a device that would mechanically strengthen a hexagonal wrench, provide ample torque, reduce mechanical fastener failure and allow for an increased speed of rotation, would fulfill a long felt need in the mechanical hand tool industry. This new invention utilizes and combines known and new technologies in a unique and novel configuration to overcome the aforementioned problems and accomplish this.

BRIEF SUMMARY

In accordance with various embodiments, a tool bit holder capable of holding multiple sizes of metric or standard SAE (imperial) hexagonal hand tool bits, is provided.

In one aspect, a hexagonal tool bit holder that has a speed rotation extension for increased rotation speed of the hexagonal bit, is provided.

In another aspect, a hexagonal tool bit holder that can accommodate multiple sizes of hexagonal wrenches per each tool bit holder, is provided.

In yet another aspect, a hexagonal tool bit holder capable of holding a hexagonal wrench such that the working end of the wrench may be at the long arm of the short wrench shaft, is provided.

In yet another aspect, a hexagonal tool bit holder that can accommodate a hexagonal wrench or a hexagonal bit therein, and provide the application of torque centered about the linear axis of the working or engaged shaft of the hexagonal tool bit.

In yet another aspect, a hexagonal tool bit holder that offers ergonomic benefits offered over the standard hexagonal wrench which is difficult to manipulate and easy to drop during use.

Lastly, a hexagonal tool bit holder that can strengthen or reinforce a hexagonal wrench about its shaft bend so as to eliminate the bending or twisting of the shaft, is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
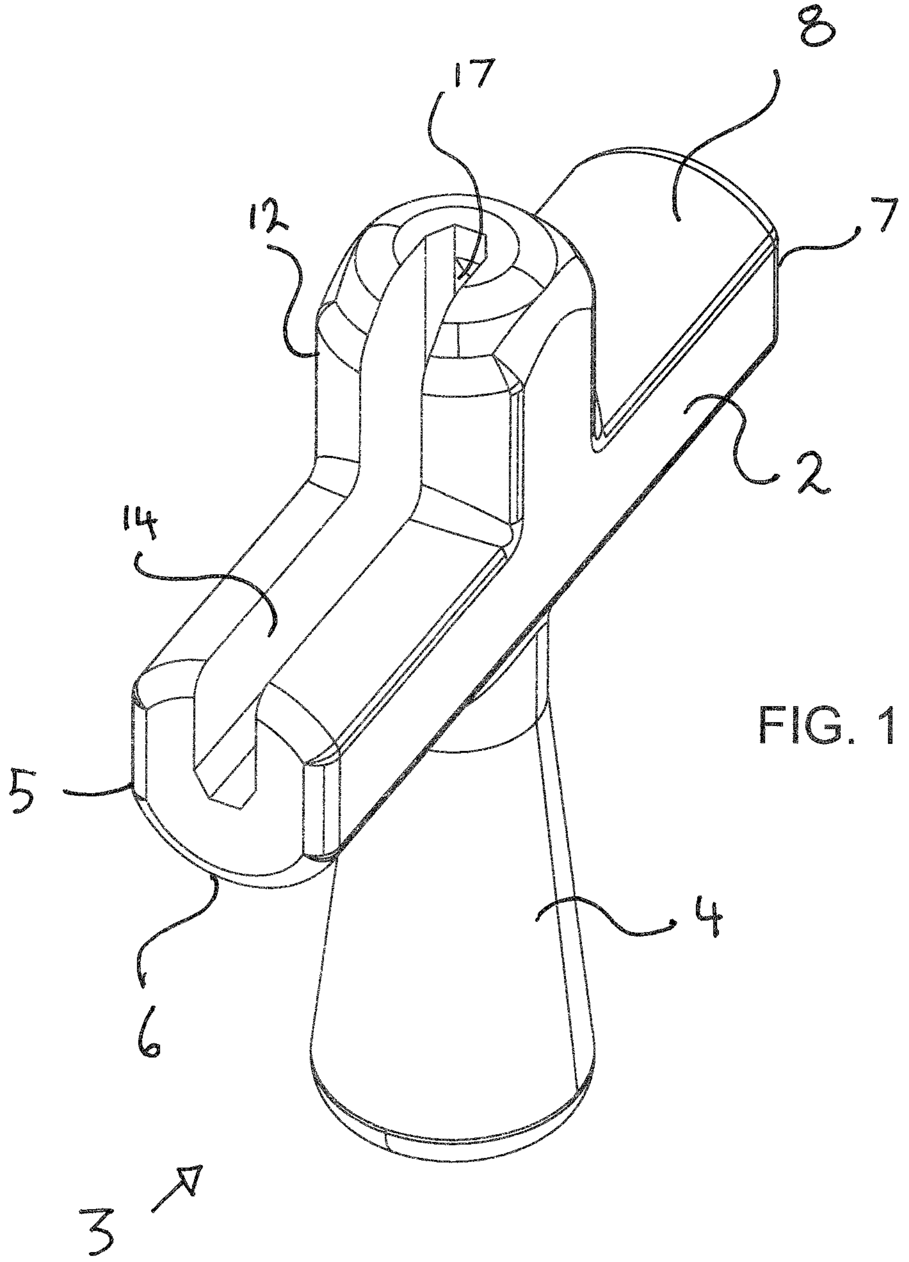
FIG. 1 is a bottom perspective view of a first embodiment small (2 mm) hexagonal tool bit holder.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details It will be understood that, although the terms first, second, etc. may be used herein to describe various elements, these elements should not be limited by these terms. These terms are only used to distinguish one element from another.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "hexagonal tool bit" refers to any tool having at least one hexagonal end sized for mating engagement into a hexagonal recess of a mechanical fastener for the purpose of rotation. Included in this definition are hexagonal wrenches and hexagonal screwdriver bits.

As used herein, "hexagonal wrench" refers to a shaft (bent at 90 degrees) having at least one hexagonal end, and what is commonly termed as a hexagonal key or Allen® key.

As used herein, the term "working or engaged" end and/or shaft of a hexagonal wrench refers to the linear end and/or shaft of a hexagonal wrench that extends down from the toll holder, and which engages the hexagonal recess or orifice of the mechanical fastener to be rotated.

As used herein, the terms "high torque position" and "low torque position" refer to whether the short end or the long end of the hexagonal wrench extends from the tool locking stub.

The present invention relates to a novel design for a tool bit holder that accommodates and secures specific ranges of hexagonal wrench sizes in different physical orientations therein, for four purposes: speed rotation of the tool for fast bolt extraction, support of the hexagonal wrench's shaft for an increased torque application, mechanically strengthening of a hexagonal wrench, and for the application of torque centered about the longitudinal axis of the working arm of the hexagonal tool bit so as to prevent the stripping out of the hexagonal socket in the mechanical fastener.

All of the three embodiments of the tool bit holders are configured as crosses. They differ only in the internal placement of their magnetic retainer, the configuration of their tool bit recesses and the dimensions of their tool bit recesses. However, In the first embodiment there is a high torque and a low torque position available depending on the positioning of the hexagonal wrench within the tool bit holder. More torque can be applied without twisting the shaft of the hexagonal wrench when the short end of the hexagonal wrench extends from the tool locking stub.

Figure 2:
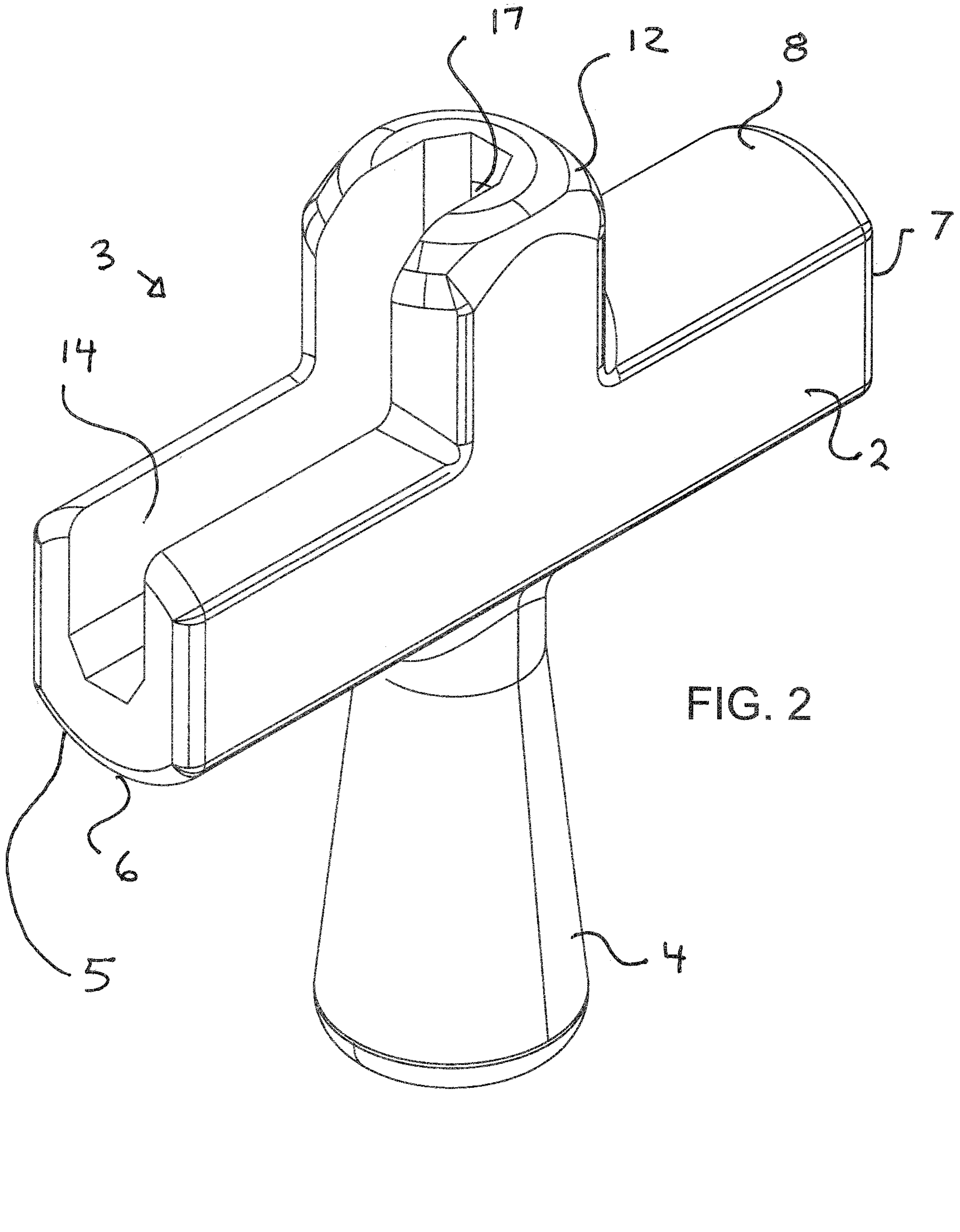
FIG. 2 is a bottom perspective view of a first embodiment medium (4 mm) hexagonal tool bit holder.
Figure 3:
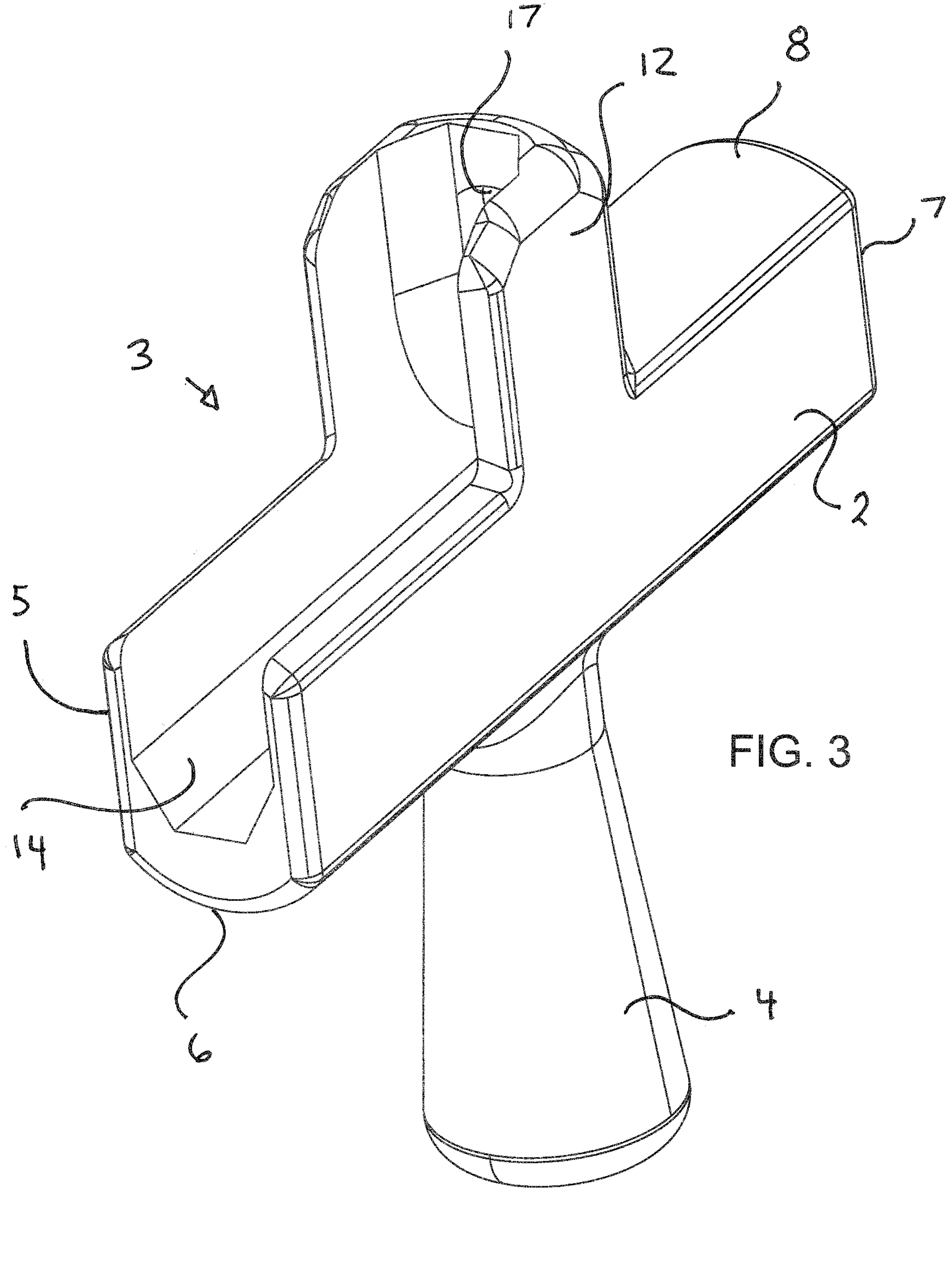
FIG. 3 is a bottom perspective view of a first embodiment large (6 mm) hexagonal tool bit holder.
Figure 4:
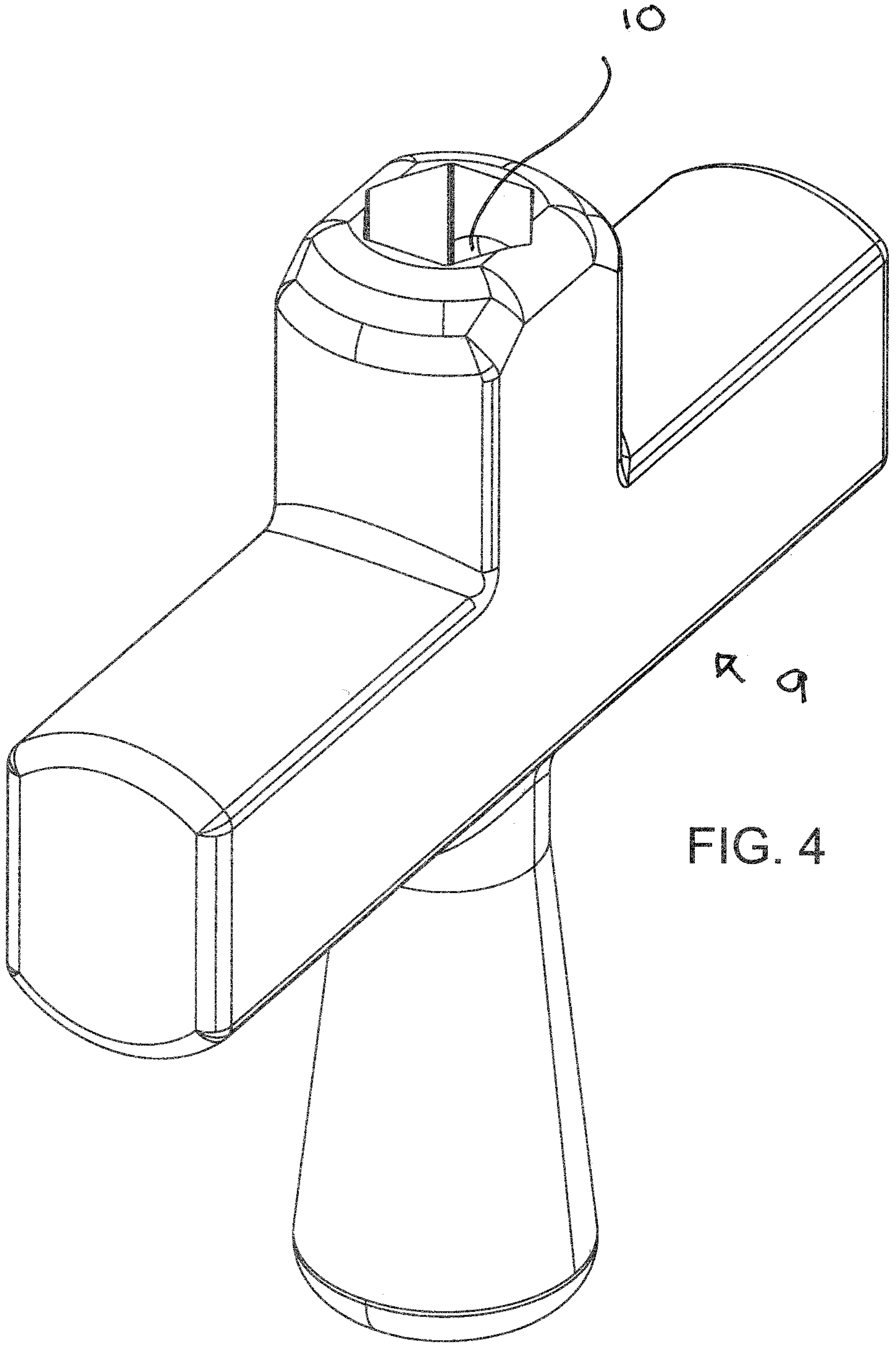
FIG. 4 is a bottom, side perspective view of a second embodiment hexagonal tool bit holder.
Figure 5:
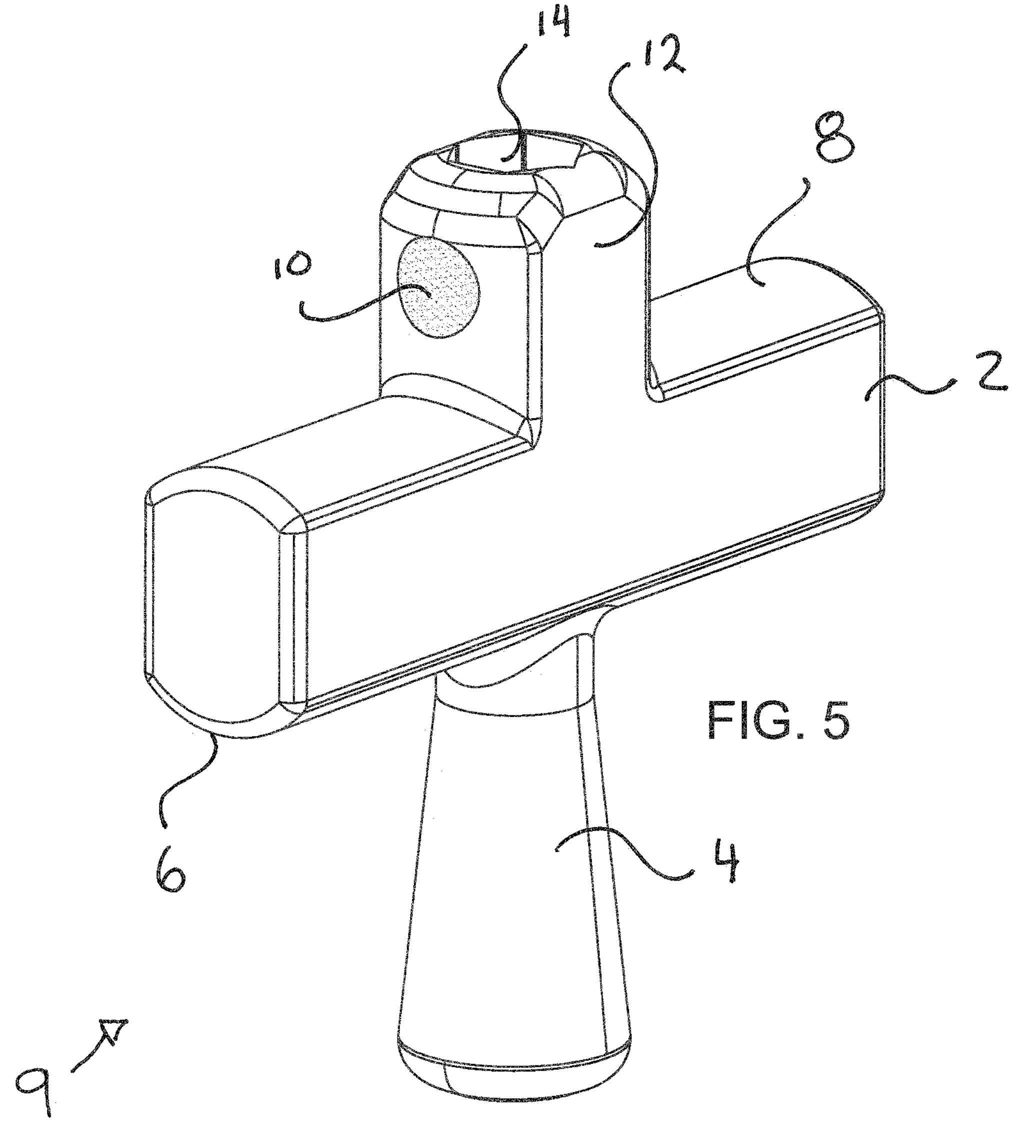
FIG. 5 is a bottom, side perspective view of the second embodiment hexagonal tool bit holder of FIG. 4 rotated 180 degrees.
Figure 6:
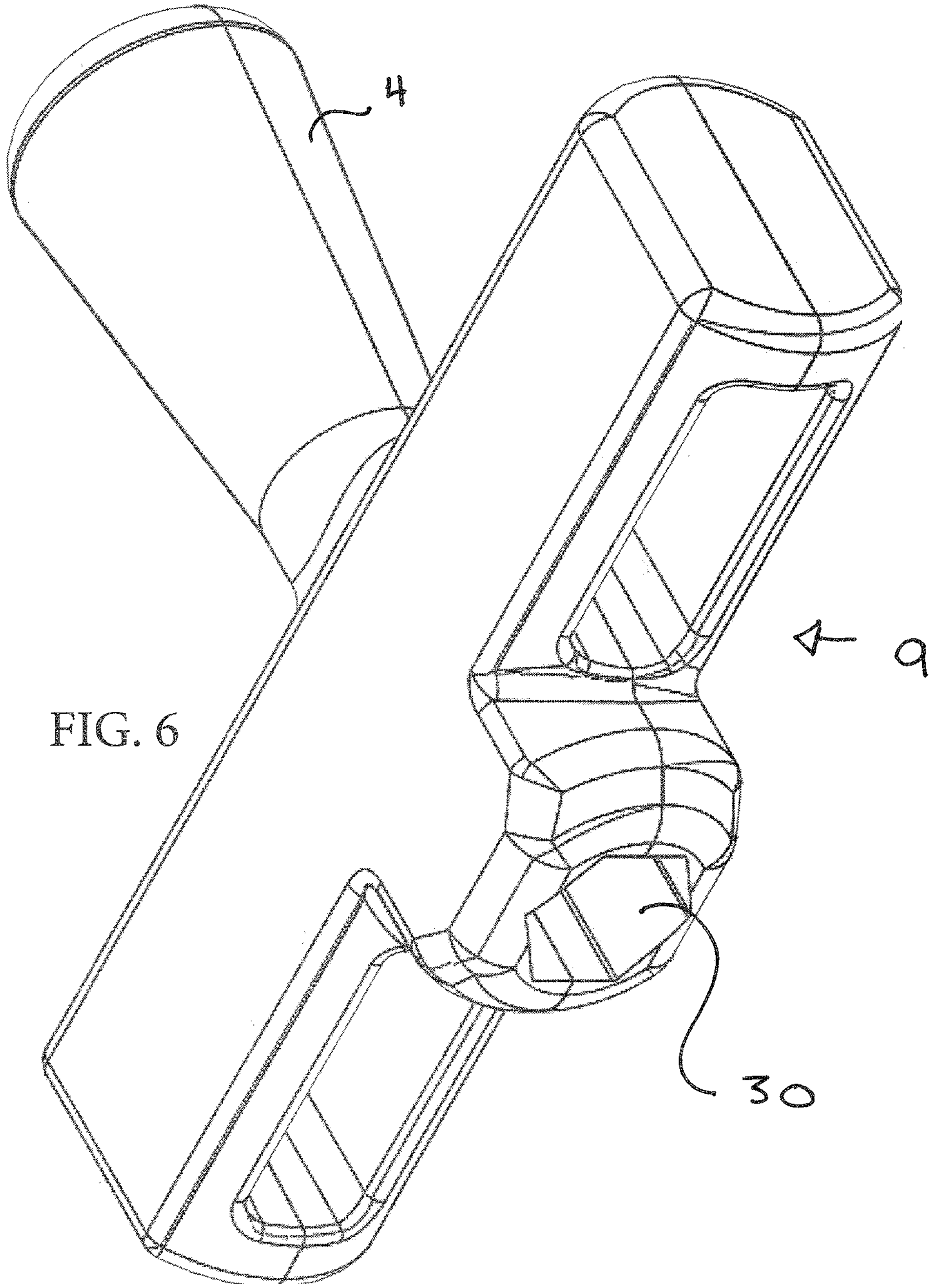
FIG. 6 is a bottom side perspective view of a third embodiment hexagonal tool bit holder.
Figure 7:
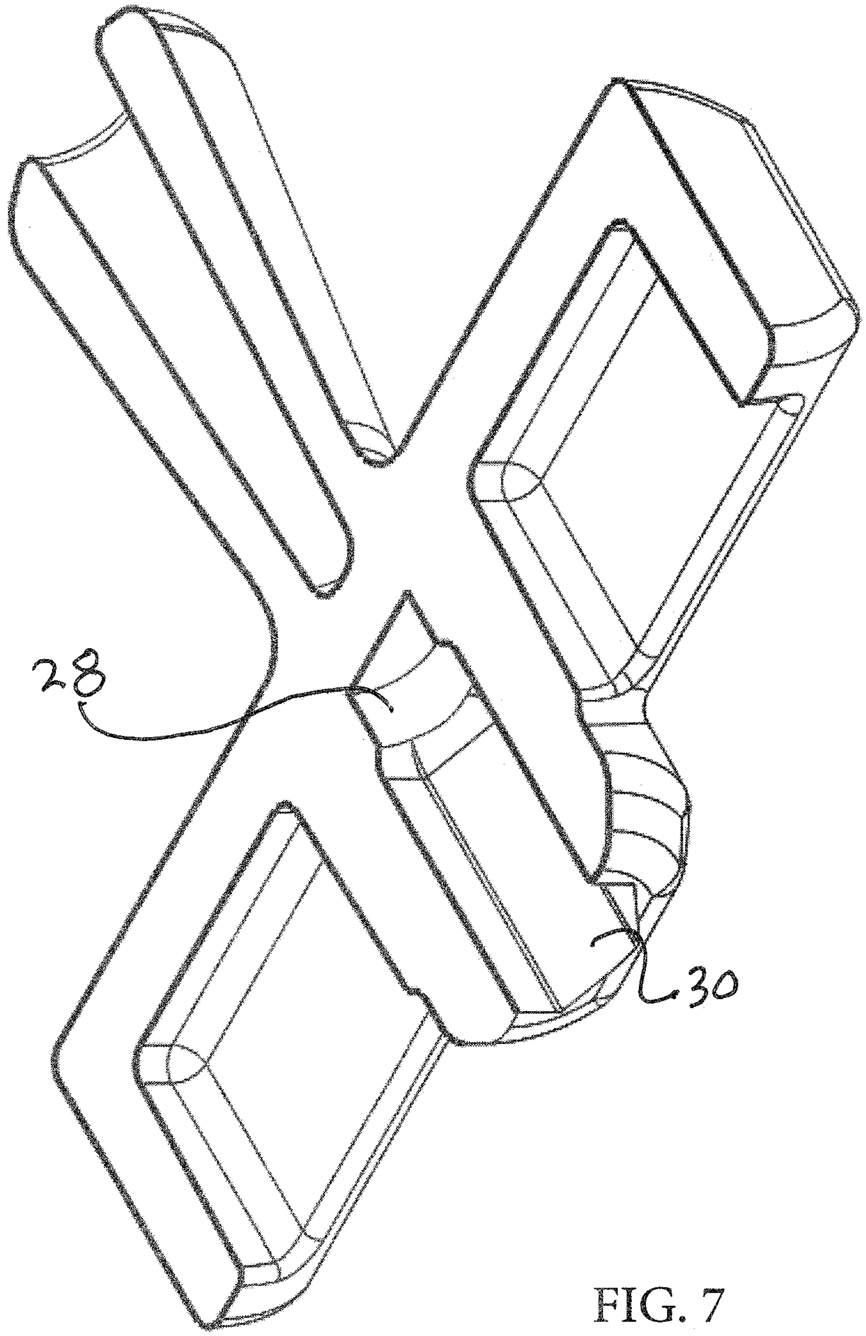
FIG. 7 is a cross sectional, side perspective view of the third embodiment hexagonal tool bit holder of FIG. 6.
Figure 8:
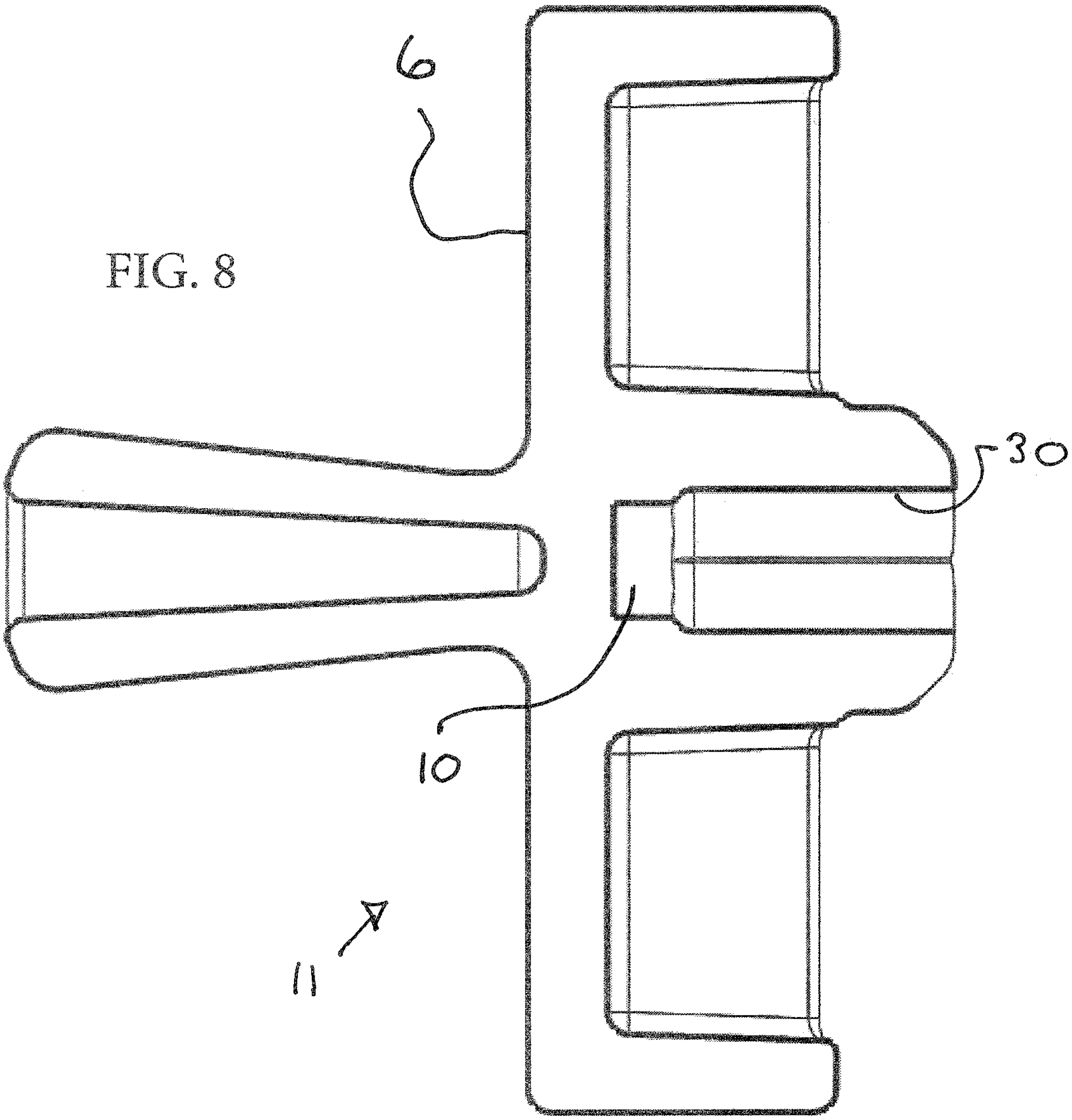
FIG. 8 is a cross sectional side view of the third embodiment hexagonal tool bit holder of FIG. 6.

Looking at the first embodiment in the various sizes of FIGS. 1-3, the second embodiment of FIGS. 4-5 and the third embodiment of FIGS. 6-8, the commonalities of their physical structures can best be seen. Each embodiment has a tool holder body which is a linear cylindrical member 2 with a tapered cylindrical spinner knob 4 extending perpendicularly from the midpoint of the top face 6 of the body 2, and a tool locking stub 12 extending perpendicularly from the midpoint of the bottom face 8 of the body 2. All embodiments utilize a magnet 10 embedded within the tool bit holder 3 or 9 and have a tool bit recess 14 formed in at least the tool locking stub 12 centered along its linear axis.

The first embodiment tool bit holder 3 is intended with use with a limited range of sizes of hexagonal wrenches. It differs from the second and third embodiments in that the tool bit recess 14 is a five sided open channel or slot formed along the linear axis of the body 2 from a first end 5 of the body 2 to the approximate midpoint of tool locking stub 12 where it perpendicularly intersects an identical five sided open channel or slot formed along the linear axis of the locking tool stub 12 and extending to the bottom end of the locking tool stub 12 so as to form a five sided, L shaped slot in the body 2 and stub 12 which is the tool bit recess 14. This tool bit recess 14 is used to facilitate entry of the hexagonal wrench 18 into a hexagonal bore 16 in the body 2. The five sided open channel or slot formed along the linear axis of the locking tool stub 12 in conjunction with the hexagonal bore 16 in the body 2 is where the hexagonal wrench resides when being used.

The L shaped five sided slot 14 formed along the linear axis of the locking tool stub 12 has three top contiguous sides of the same width and the remaining sides are wider than the width of the top three sides and are parallel to each other so as to accommodate the non-frictional insertion of a hexagonal wrench into the tool 2.

Extending from the second end of the body 2 is a hexagonal bore 16 formed along the linear axis of the body 2 and extending to the L shaped tool bit recess 14 in the main body 2. The top three contiguous sides of the channel formed along the linear axis of the body 2 are colinear and coplanar with three contiguous sides of the six sides of the hexagonal bore 16.

The magnet 10 is matingly engaged in a magnet bore 17 formed through the side wall of the tool locking stub 12 such that one of the magnet faces extends to the bottom of the five sided L shaped tool bit recess 14 formed along the linear axis of the locking tool stub 12.

Figure 9:
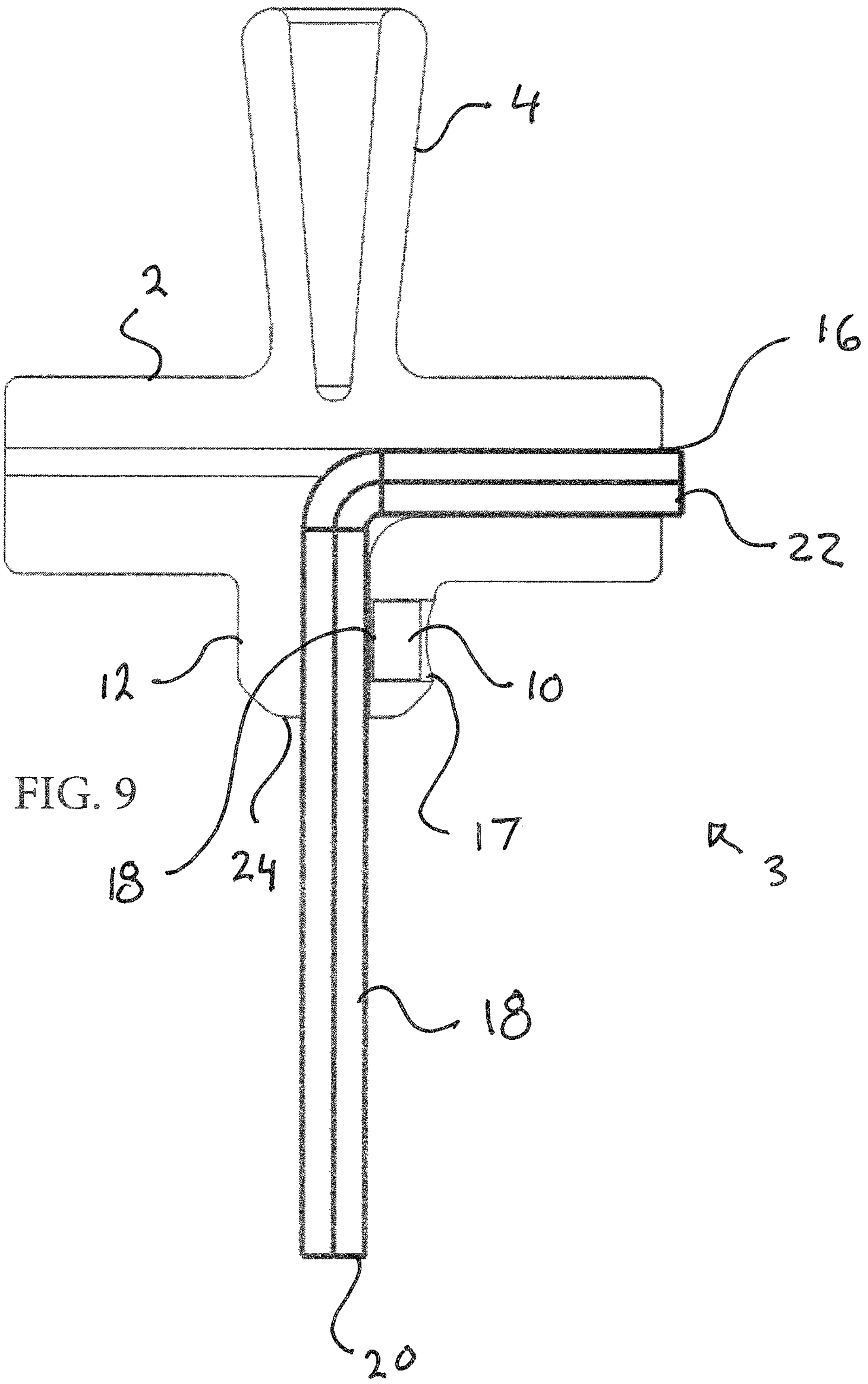
FIG. 9 is a side cross sectional view of the first embodiment hexagonal tool bit holder with a hexagonal wrench therein oriented long shaft down.
Figure 10:
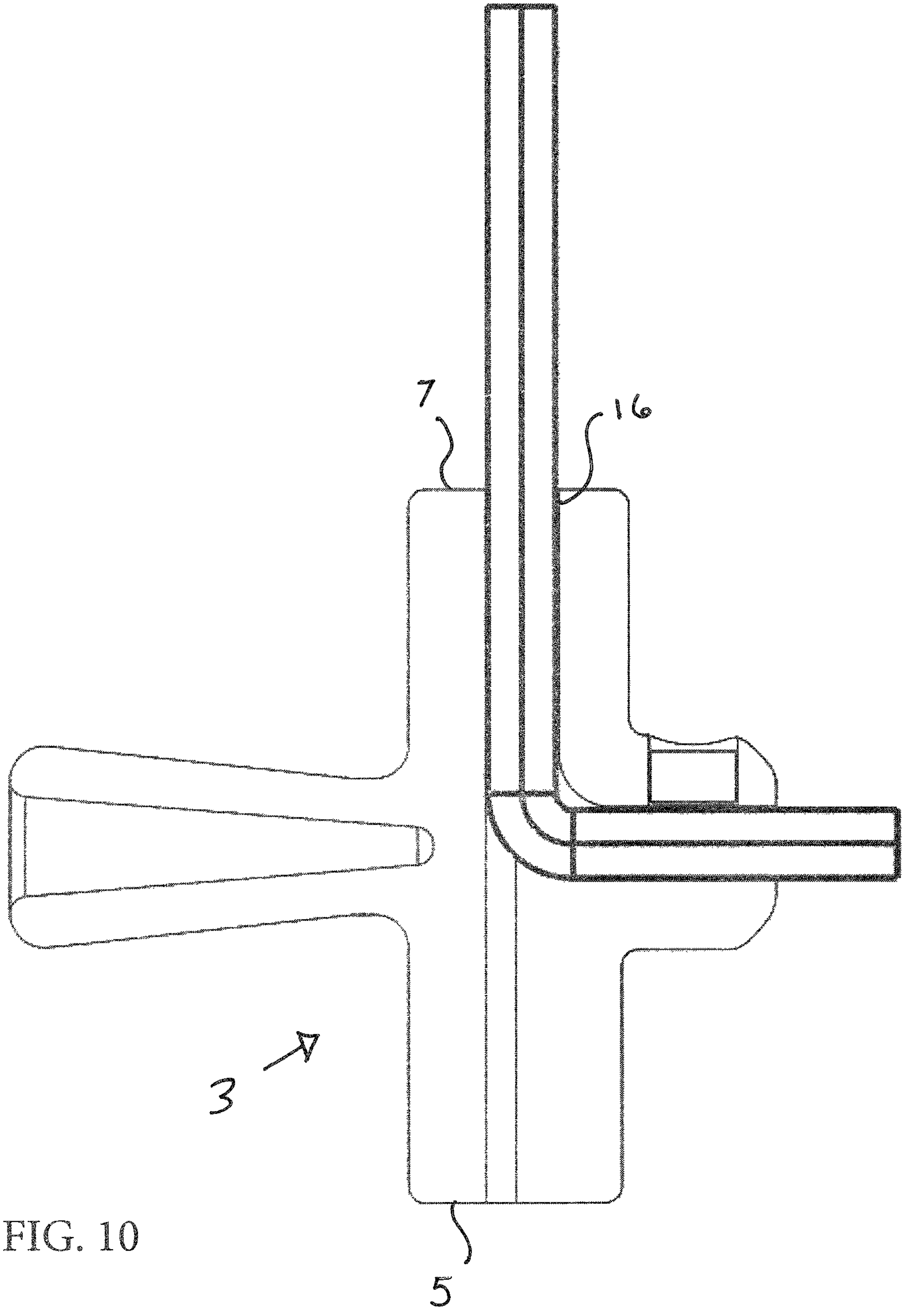
FIG. 10 is a side cross sectional view of the first embodiment hexagonal tool bit holder with a hexagonal wrench therein orientated short shaft down.
Figure 11:
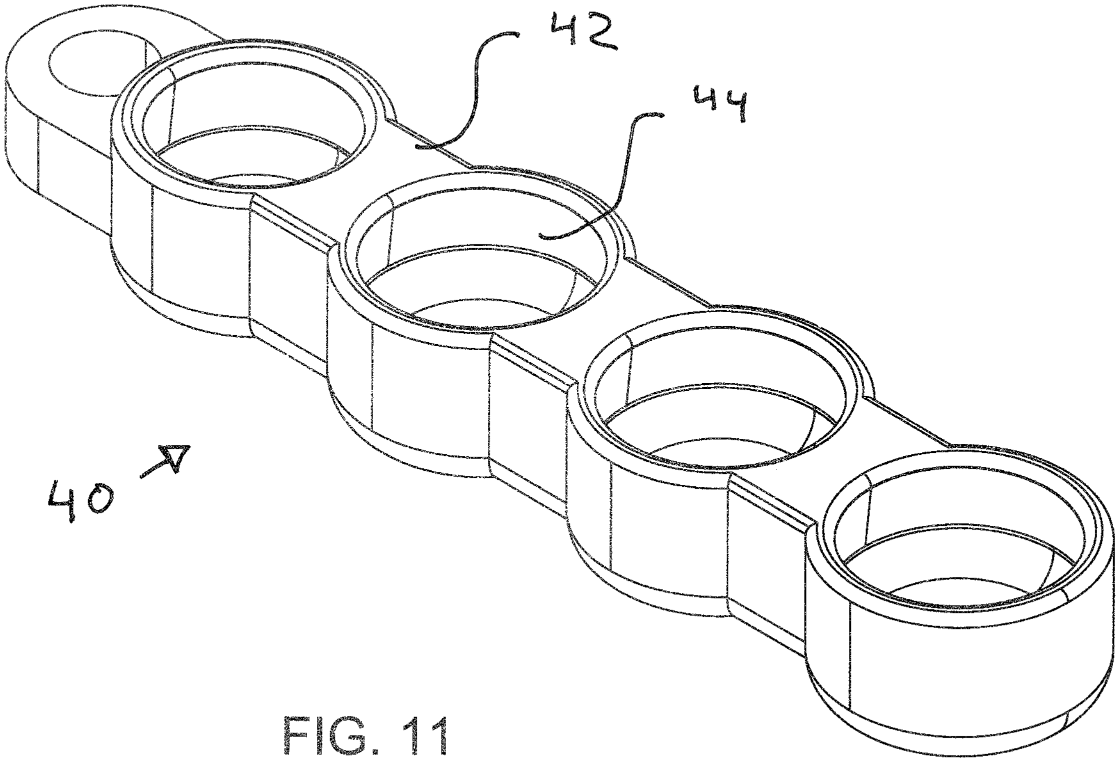
FIG. 11 is a hexagonal tool bit holder organization tray.
Figure 12:
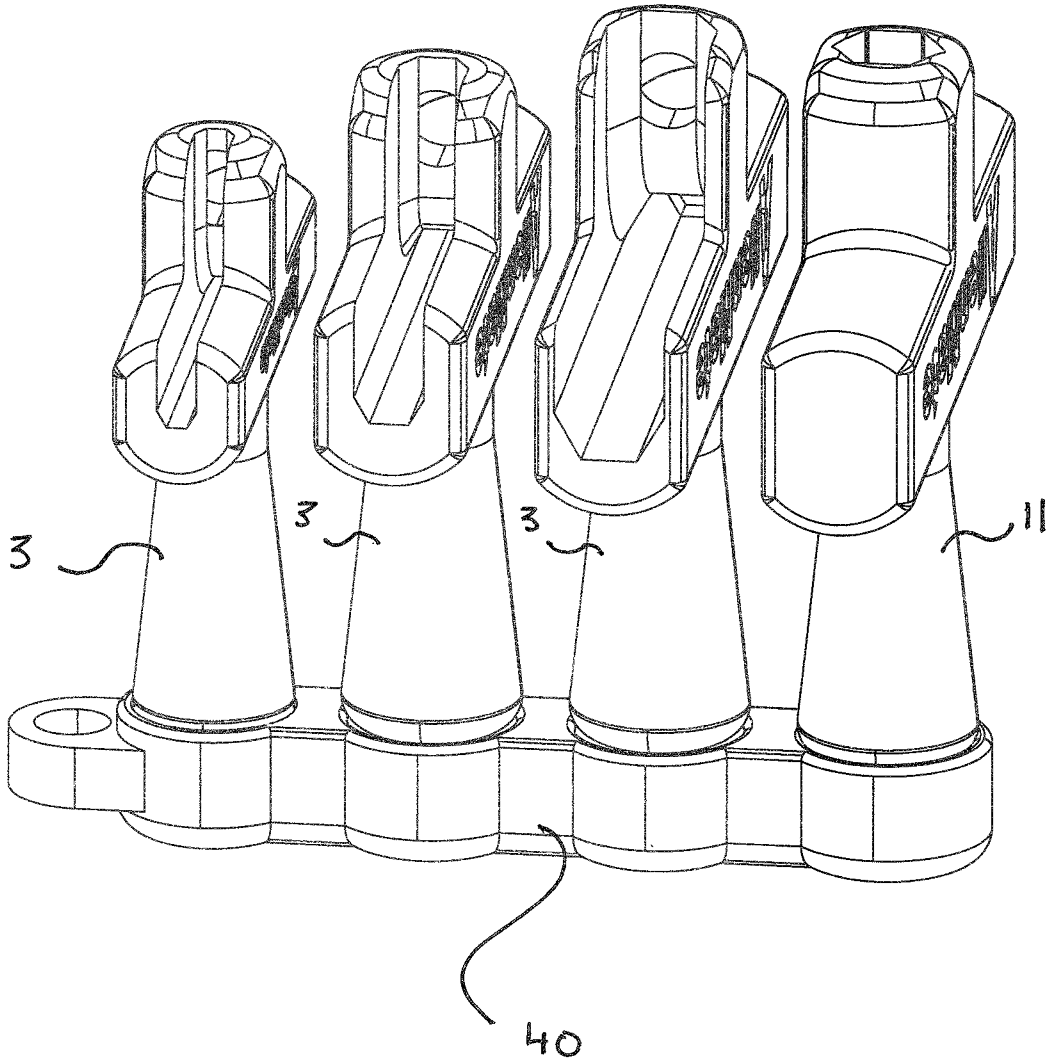
FIG. 12 is a four piece hexagonal tool bit holder set in the organization tray.

Looking at FIGS. 9 and 10 the use of the first embodiment tool bit holder 3 can best be explained. The first embodiment tool bit holder 3 can hold a hexagonal wrench 18 such that the long arm 20 or short arm 22 can reside in the five sided L shaped channel formed in the locking tool stub 12 and extend beyond its bottom end 24. The other end of the hexagonal wrench (short or long) will reside in the hexagonal bore 16 in the body 2. The length of the end of the hexagonal wrench 18 that resides in the hexagonal bore 16 determines the amount of torque that can be applied before distorting the hexagonal wrench 18. To ready the tool for use in the high torque position, the long leg of the hexagonal wrench 18 is placed into the five sided open channel or slot formed in the linear axis of the body 2 and the hexagonal wrench 18 is slid into the hexagonal bore 16 until the short leg of the hexagonal wrench abuts the five sided open channel or slot formed in the locking tool stub 12 and contacts the magnet 10.

To insert the hexagonal wrench 18 into the first embodiment tool holder 3 so as to place it in the low torque position, the same process is followed except with the short arm 22 is inserted into the five sided open channel 14 formed along the linear axis of the main body 2 and slid along the linear axis of the main body 2, entering the hexagonal bore 16 until the long arm 20 abuts the bottom face of the five sided channel formed in the linear axis of the locking tool stub 12 and contacts the magnet 10.

FIGS. 1, 2 and 3 illustrate three different sizes of hexagonal tool bit holders. Size A ranges from 0-2 mm, size B ranges from 2-4 mm, and size C ranges from 4-6 mm. The increasing width of the five sided open channel 14 is noticeable.

In either hexagonal wrench 18 size of the first embodiment tool bit 3, the magnet 10 retains the hexagonal wrench 18 from falling out. To loosen a mechanical fastener, the working arm of the hexagonal wrench 18 (that arm which extends from the bottom end of the locking tool stub 12) is inserted perpendicularly into the mating socket of the mechanical fastener. With the index and middle finger each on the same side of the body 2 but on different sides of the spinner knob 4, and the thumb on the other side of the body 2 centered in front of the spinner knob 4, the tool and tool holder are rotated. In this configuration, the torque exerted on the working arm of the hexagonal wrench 18 comes from a position centered above the linear axis of this working arm. The prevents the hexagonal wrench 18 from misaligning the linear axis of its working end with the linear axis of the mechanical fastener's mating socket and stripping out its hexagonal socket configuration. This commonly happens when the hexagonal wrench 18 is rotated from its other end. Once the mechanical fastener is loosened, the user's grip is changed so as to grasp the spinner knob 4 between the same index finger, middle finger and thumb and the first embodiment tool bit holder 3 is quickly rotated between them, therein quickly removing the mechanical fastener.

When hexagonal wrenches 18 are used to loosen or tighten mechanical fasteners in the conventional method without the first embodiment tool bit holder 3, the user grasps the bent, non-working arm and rotates it about the linear axis of the working arm. This applied torque often induces a point of failure at the 90 degree intersection of the two arms, which is the hexagonal tool's weakest point. However, when the hexagonal wrench 18 is inserted into the first embodiment tool bit holder 3, this area of the hexagonal wrench 18 is strengthened with the support it receives from the side wall of the five sided L shaped tool bit recess formed in the body 2 and the locking tool stub 12. This prevents the twisting of the hexagonal wrench 18 at its bend, which is its weakest point. This allows additional torque to be applied to the hexagonal wrench 18 beyond what its design limits would allow. This is helpful in extracting stubborn mechanical fasteners.

Hexagonal wrenches 18 are manufactured in two different systems of measurement. The sizes indicated are measured between opposing parallel, planar, faces of the hexagonal wrench. It is important to note that the hexagonal wrench 18 utilized in the first embodiment tool bit holder 3 need not be sized for mating engagement with the same size of five sided L shaped tool bit slot 14 formed in the tool. The hexagonal wrench 18 can be smaller than this slot 14 and still function, but within specific size limitations. These are set forth in Table 1.

It is to be noted that unlike conventional hexagonal wrench holders, the hexagonal wrench is not frictionally engaged in the tool bit holder, rather the hexagonal wrench loosely fits into the hexagonal bore 16 and the tool bit recess formed in the locking tool stub 12 and does not contact all six of five sides of these recesses.

The sizes indicated for the tool bit holder are measured between opposing parallel, planar, internal faces of the hexagonal bore 16. The top three internal faces of the L shaped slot 14 share the same width dimensions and geometric configuration as the top three internal faces of the hexagonal bore.

Since these first embodiment tool bit holders 3 are best suited for work with the smaller sizes of hexagonal wrenches 18, they are only sized for use with a select range of sizes. The imperial or standard SAE system set of hexagonal wrenches 18 these tool bit holders are designed to work with include: 1/16", 5/64", 3/32", 7/64", 1/8", 9/64", 5/32", 3/16" and 7/32" sized wrenches. There are also the additional precision SAE sizes of 0.028", 0.035", 0.05" in this set The metric system of hexagonal wrenches these tool bit holders are designed to work with include: 1.5 mm, 2 mm, 2.5 mm, 3 mm, 4 mm, 4.5 mm, 5 mm, 5.5 mm and 6 mm sized wrenches. There are also the additional precision metric sizes of 0.7 mm, 0.9 mm, and 1.3 mm in this set.

The first embodiment hexagonal tool bit holders 3 accommodate both metric and SAE hexagonal wrenches in the five sizes of A (0-2 mm), B (1-3 mm), C (2-4 mm), D (3-5 mm) and E (4-6 mm). It is to be noted that there is an overlap between the five sizes of tool bit holder. In this way, only three or four tool bit holders are needed to cover all or the majority of hexagonal wrenches 18 in the specified SAE and metric ranges as set forth below.

TABLE 1

| SAE Hexagonal Wrench Sizes | Hexagonal Tool Bit Holder Size | | | Metric Hexagonal Wrench Sizes |
|---|---|---|---|---|
| 0.028" (0.71 mm) | A 0-2 mm | | | 0.7 mm |
| 0.035" (0.89 mm) | A 0-2 mm | | | 0.9 mm |
| 0.05" (1.27 mm) | A 0-2 mm | | | |
| | A 0-2 mm | B 1-3 mm | | 1.3 mm |
| 1/16" (1.6 mm) | A 0-2 mm | B 1-3 mm | | 1.5 mm |
| 5/64" (2.0 mm) | A 0-2 mm | B 1-3 mm | C 2-4 mm | 2 mm |
| 3/32" (2.4 mm) | | B 1-3 mm | C 2-4 mm | 2.5 mm |
| 7/64" (2.7 mm) | | B 1-3 mm | C 2-4 mm | |
| | D 3-5 mm | B 1-3 mm | C 2-4 mm | 3 mm |
| 1/8" (3.1 mm) | D 3-5 mm | | C 2-4 mm | |
| 9/64" (3.6 mm) | D 3-5 mm | | C 2-4 mm | |
| 5/32" (3.9 mm) | D 3-5 mm | | C 2-4 mm | |
| | D 3-5 mm | E 4-6 mm | C 2-4 mm | 4 mm |
| | D 3-5 mm | E 4-6 mm | | 4.5 mm |
| 3/16" (4.8 mm) | D 3-5 mm | E 4-6 mm | | 5 mm |
| 7/32" (5.5 mm) | | E 4-6 mm | | 5.5 mm |
| | | E 4-6 mm | | 6 mm |

The second and third embodiment tool bit holders 9 and 11 have a different tool bit recess than the first embodiment tool bit holder's five sided L shaped slot 14. It is a 1/4 inch hexagonal recess 30 extending from the bottom of the locking tool tab 12 along its linear axis to a depth enough to secure a screwdriver tool bit therein with its working end extending beyond the bottom of the locking tool tab 12.

The second embodiment tool bit holder 9 (FIGS. 5 and 6) and the third embodiment tool bit holder 11 (FIGS. 7 and 8) accommodate only the ¼" hexagonal non-working end of a screwdriver tool bit. These two embodiments differ from each other only in the placement of their magnetic retention device (magnet 10). The second embodiment tool bit holder 9 has its magnet 10 retained in a bore 19 through the side of the locking tool tab 12. (FIG. 9) The third embodiment tool bit holder 11 has its magnet 10 retained in a bore 28 formed at the end of the hexagonal recess 30 in the locking tool tab 12. (FIG. 8)

In mechanical fastener operation, the second and third embodiment tool bit holders 9 and 11 function identically to the first embodiment tool bit holder 3. The tool bit though, is just directly inserted into the hexagonal recess 30 until drawn fully into place by the magnet 10.

There is fourth embodiment tool holder. In this embodiment the tool bit holder looks and functions identical to the first three embodiments except the tool bit (a hexagonal wrench or screwdriver tool bit) is permanently embedded into the body of the tool bit holder. Basically, the main body 2, and tool locking tab have the tool bit inserted and the remaining interstitial void between the locking tab and the tool bit and the linear body 2 and the tool bit body 2 filled with the same polymer the tool body is made of, although there is a plethora of other resins and epoxies that would function identically if not better. The tool bit, however, is not removeable or interchangeable with different sizes or bits. When in use, it is operated the exact same as the other embodiments. This fourth embodiment is ideal for DIY furniture assembly. It lets the assembler utilize the spinner knob 4 for fast rotations and the liner block 2 for the application of maximum torque. There is no fear of the tool bit dislodging from the toll bit holder 2.

There is an organizational tray 40 that is a linear body 42 with a series of connected circular cups 44 formed thereon on one side into which the spinner knobs 4 of the various tool holders 3, 9 and 11 may be frictionally fit.

While certain features and aspects have been described with respect to exemplary embodiments, one skilled in the art will recognize that numerous modifications are possible. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A hexagonal tool bit holder, capable of holding a range of various sizes of hexagonal tool bits, comprising:

a cylindrical body having a top face and a bottom face and a first end and a second end;

a cylindrical spinner knob extending perpendicularly from said top face; a cylindrical tool locking stub extending perpendicularly from said bottom face;

a five sided L shaped slot formed in said cylindrical body from said first end into a center of said cylindrical tool locking stub; and a hexagonal bore formed from said second end to said center of said cylindrical tool locking stub so as to intersect with said L shaped slot in said cylindrical tool locking stub.

2. The hexagonal tool bit holder of claim 1 further comprising:

a magnet bore formed in said tool bit holder; and a magnet with a first end and a second end, said magnet housed in said magnet bore with said first end extending to said five sided L shaped slot.

3. The hexagonal tool bit holder of claim 2 wherein said L shaped slot has five sides that are coplanar and colinear with three contiguous sides of said hexagonal bore.

4. The hexagonal tool bit holder of claim 3 wherein said hexagonal bore has a hexagonal bore diameter that operably accommodates a range of different diameter sizes of hexagonal tools.

5. The hexagonal tool bit holder of claim 4 wherein said hexagonal bore diameter is selected from the set of hexagonal bore diameters consisting of 2, 3, 4, 5 and 6 mm bore diameters.

6. The hexagonal tool bit holder of claim 4 wherein said hexagonal bore diameter is selected from the set of hexagonal bore diameters that can accommodate hexagonal wrenches consisting of hexagonal wrench diameters in the ranges of 0-2 mm, 1-3 mm, 2-4 mm, 3-5 mm and 4-6 mm.

7. The hexagonal tool bit holder of claim 2 wherein said magnet bore is formed in said tool locking stub.

8. The hexagonal tool bit holder of claim 1 wherein said cylindrical spinner knob is tapered.

* * * * *